United States Patent
Senoue

(10) Patent No.: US 10,998,540 B2
(45) Date of Patent: May 4, 2021

(54) METHOD FOR PRODUCING SULFIDE SOLID-STATE BATTERY, AND SULFIDE SOLID-STATE BATTERY

(71) Applicant: Toyota Jidosha Kabushiki Kaisha, Toyota (JP)

(72) Inventor: Masaharu Senoue, Seto (JP)

(73) Assignee: Toyota Jidosha Kabushiki Kaisha, Toyota (JP)

(*) Notice: Subject to any disclaimer, the term of this patent is extended or adjusted under 35 U.S.C. 154(b) by 258 days.

(21) Appl. No.: 16/198,175

(22) Filed: Nov. 21, 2018

(65) Prior Publication Data
US 2019/0165357 A1 May 30, 2019

(30) Foreign Application Priority Data
Nov. 28, 2017 (JP) .............................. JP2017-228409

(51) Int. Cl.
*H01M 4/04* (2006.01)
*H01M 4/1395* (2010.01)
(Continued)

(52) U.S. Cl.
CPC ......... *H01M 4/0404* (2013.01); *H01M 4/043* (2013.01); *H01M 4/0416* (2013.01); *H01M 4/0471* (2013.01); *H01M 4/133* (2013.01); *H01M 4/134* (2013.01); *H01M 4/1393* (2013.01); *H01M 4/1395* (2013.01); *H01M 4/366* (2013.01); *H01M 4/386* (2013.01); *H01M 4/587* (2013.01); *H01M 4/62* (2013.01);
(Continued)

(58) Field of Classification Search
CPC ......... H01M 10/0525; H01M 10/0562; H01M 10/058; H01M 10/0585; H01M 2004/021; H01M 2004/027; H01M 2300/0068; H01M 4/0404; H01M 4/0416; H01M 4/043; H01M 4/0471; H01M 4/133; H01M 4/134; H01M 4/1393; H01M 4/1395; H01M 4/366; H01M 4/386; H01M 4/587; H01M 4/62; H01M 4/622; H01M 4/661; Y02E 60/10
See application file for complete search history.

(56) References Cited

U.S. PATENT DOCUMENTS

| | | | | |
|---|---|---|---|---|
| 2008/0003503 A1* | 1/2008 | Kawakami | ............ | H01M 4/134 |
| | | | | 429/231.5 |
| 2014/0162139 A1* | 6/2014 | Hoshiba | ................ | H01M 4/623 |
| | | | | 429/322 |
| 2015/0280221 A1* | 10/2015 | Abdelsalam | ............ | H01M 4/64 |
| | | | | 429/217 |

FOREIGN PATENT DOCUMENTS

JP  2014-116154 A  6/2014

* cited by examiner

*Primary Examiner* — Adam A Arciero
(74) *Attorney, Agent, or Firm* — Dinsmore & Shohl LLP

(57) ABSTRACT

A method for producing a sulfide solid-state battery in which, an anode mixture (a) is layered over a surface of an anode current collector, to form an anode mixture layer A1, the anode mixture (a) containing a polyamic acid, and silicon-based active material but not containing a sulfide solid electrolyte; the anode mixture layer A1 is heated to imidize the polyamic acid, to make an anode mixture layer A2; a sulfide solid electrolyte is layered over a surface of the anode mixture layer A2; to be pressed to insert the sulfide solid electrolyte into a void in the anode mixture layer A2, to make an anode mixture layer A3; and thereafter an anode mixture (b) is layered over a surface of the anode mixture layer A3, to form an anode mixture layer B, the anode mixture (b) containing carbonaceous active material and binder.

13 Claims, 3 Drawing Sheets

(51) Int. Cl.
    *H01M 4/1393*    (2010.01)
    *H01M 4/133*     (2010.01)
    *H01M 4/134*     (2010.01)
    *H01M 4/36*      (2006.01)
    *H01M 4/38*      (2006.01)
    *H01M 4/587*     (2010.01)
    *H01M 4/62*      (2006.01)
    *H01M 10/0525*    (2010.01)
    *H01M 10/058*     (2010.01)
    *H01M 10/0562*    (2010.01)
    *H01M 10/0585*    (2010.01)
    *H01M 4/66*      (2006.01)
    *H01M 4/02*      (2006.01)

(52) U.S. Cl.
    CPC ......... *H01M 4/622* (2013.01); *H01M 10/058* (2013.01); *H01M 10/0525* (2013.01); *H01M 10/0562* (2013.01); *H01M 10/0585* (2013.01); *H01M 4/661* (2013.01); *H01M 2004/021* (2013.01); *H01M 2004/027* (2013.01); *H01M 2300/0068* (2013.01)

METHOD FOR PRODUCING SULFIDE SOLID-STATE BATTERY, AND SULFIDE SOLID-STATE BATTERY

CROSS-REFERENCE TO RELATED APPLICATIONS

The present application claims priority to Japanese Patent Application No. 2017-228409 filed Nov. 28, 2017, which is hereby incorporated by reference in its entirety.

FIELD

The present application relates to a method for producing a sulfide solid-state battery etc.

BACKGROUND

Patent Literature 1 discloses a sulfide solid-state battery including a positive electrode, a negative electrode, and a solid electrolyte layer provided between the positive electrode and the negative electrode. In Patent Literature 1, the negative electrode is made by using a silicon-based active material as a negative active material, and a polyimide as a binder, and such a specific method for producing a negative electrode like this is disclosed that after a mixture layer containing a silicon-based active material and a polyamic acid is provided over a surface of a negative electrode current collector, imidizing the polyamic acid by heat treatment, to make a polyimide.

CITATION LIST

Patent Literature

Patent Literature 1: JP 2014-116154 A

SUMMARY

Technical Problem

The expanding/contracting volume of silicon-based active material according to charge and discharge is large, and ion paths in an anode mixture layer are easy to cut off due to this expansion/contraction, which is problematic. It is believed to be effective for solving this problem that a sulfide solid electrolyte is contained in an anode mixture layer to secure ion paths. It is also believed to be effective as measures against expansion/contraction of silicon-based active material that a binder of high strength and a high elastic modulus such as a polyimide is used. Based on these thoughts, the inventor of the present application attempted to apply the technique disclosed in Patent Literature 1 to provide an anode mixture layer containing silicon-based active material, a polyamic acid, and a sulfide solid electrolyte over a surface of an anode current collector, and thereafter imidize the polyamic acid by heat treatment to make a polyimide. However, the inventor encountered such a new problem that in this case, an anode is not produced well as a result of decomposition of a sulfide solid electrolyte due to heat treatment, deteriorated peel strength of an anode mixture layer and an anode current collector because of reaction between a sulfide solid electrolyte and an anode current collector, or the like.

Solution to Problem

The present application discloses, as one means for solving the above problem, a method for producing a sulfide solid-state battery that includes a cathode, an anode, and a solid electrolyte layer provided between the cathode and the anode, the method comprising: layering an anode mixture (a) over a surface of an anode current collector, to form an anode mixture layer A1, the anode mixture (a) containing a polyamic acid, and silicon-based active material but not containing a sulfide solid electrolyte; heating the anode mixture layer A1 to imidize the polyamic acid, to make an anode mixture layer A2 which contains a polyimide and in which a void is present; layering a sulfide solid electrolyte over a surface of the anode mixture layer A2 on an opposite side of the anode current collector; pressing the anode mixture layer A2, over which the sulfide solid electrolyte is layered, to insert the sulfide solid electrolyte into the void in the anode mixture layer A2, to make an anode mixture layer A3 that contains the sulfide solid electrolyte; and layering an anode mixture (b) over a surface of the anode mixture layer A3, to form an anode mixture layer B, the anode mixture (b) containing carbonaceous active material and binder.

In some embodiments of the method of the present disclosure, the anode mixture layer A3 is no more than 3 μm in thickness.

In some embodiments of the method of the present disclosure, the anode current collector contains copper.

In some embodiments of the method of the present disclosure, a relation of 10≤β−α is satisfied when a volume ratio of an anode active material in the anode mixture layer A3 is α (%), and a volume ratio of an anode active material in the anode mixture layer B is β (%).

In some embodiments of the method of the present disclosure, the volume ratio of the anode active material in the anode mixture layer A3 is no more than 60%.

In some embodiments of the method of the present disclosure, the binder contained in the anode mixture layer B is different from a binder contained in the anode mixture layer A3.

In some embodiments of the method of the present disclosure, the binder contained in the anode mixture layer B is styrene-butadiene rubber.

For example, a sulfide solid-state battery produced according to the producing method of this disclosure has the following structure in an embodiment: that is, the present application discloses a sulfide solid-state battery that includes a cathode, an anode, and a solid electrolyte layer provided between the cathode and the anode, wherein the anode comprises: an anode current collector; an anode mixture layer A that is provided over a surface of the anode current collector; and an anode mixture layer B that is provided over a surface of the anode mixture layer A on an opposite side of the anode current collector, the anode mixture layer A comprises: silicon-based active material; a polyimide; and a sulfide solid electrolyte, the anode mixture layer B comprises: carbonaceous active material; and binder, and the anode mixture layer A is no more than 3 μm in thickness.

In some embodiments of the sulfide solid-state battery of the present disclosure, the anode current collector contains copper.

In some embodiments of the sulfide solid-state battery of the present disclosure, a relation of 10≤β−α is satisfied when a volume ratio of an anode active material in the anode mixture layer A is α (%), and a volume ratio of an anode active material in the anode mixture layer B is β (%).

In some embodiments of the sulfide solid-state battery of the present disclosure, the volume ratio of the anode active material in the anode mixture layer A is no more than 60%.

In some embodiments of the sulfide solid-state battery of the present disclosure, a binder contained in the anode mixture layer A is different from the binder contained in the anode mixture layer B.

In some embodiments of the sulfide solid-state battery of the present disclosure, the binder contained in the anode mixture layer B is styrene-butadiene rubber.

In the producing method of this disclosure, a sulfide solid electrolyte is not contained in the anode mixture layer A1 or A2 in the stage of heating a polyamic acid to make a polyimide. Thus, a sulfide solid electrolyte does not decompose due to the heat treatment, or does not react with an anode current collector.

In the producing method of this disclosure, a sulfide solid electrolyte is pressed and thrust into the anode mixture layer A2, which can lead to arrangement of the sulfide solid electrolyte around silicon-based active material in the anode mixture layer A3. Thus, many ion paths can be secured in the anode mixture layer A3, and ion paths are hard to cut off even if the silicon-based active material expands/contracts during charge and discharge.

Furthermore, according to the findings of the inventor of the present application, it is sometimes difficult to obtain the capacity per electrode volume necessary for a battery of a high capacity for the anode mixture layer A3 only. In contrast, in the producing method of this disclosure, the capacity of an anode can be secured by further layering the anode mixture layer B over the surface of the anode mixture layer A3.

DETAILED DESCRIPTION OF EMBODIMENTS

1. Method for Producing Sulfide Solid-State Battery

Figure 1:
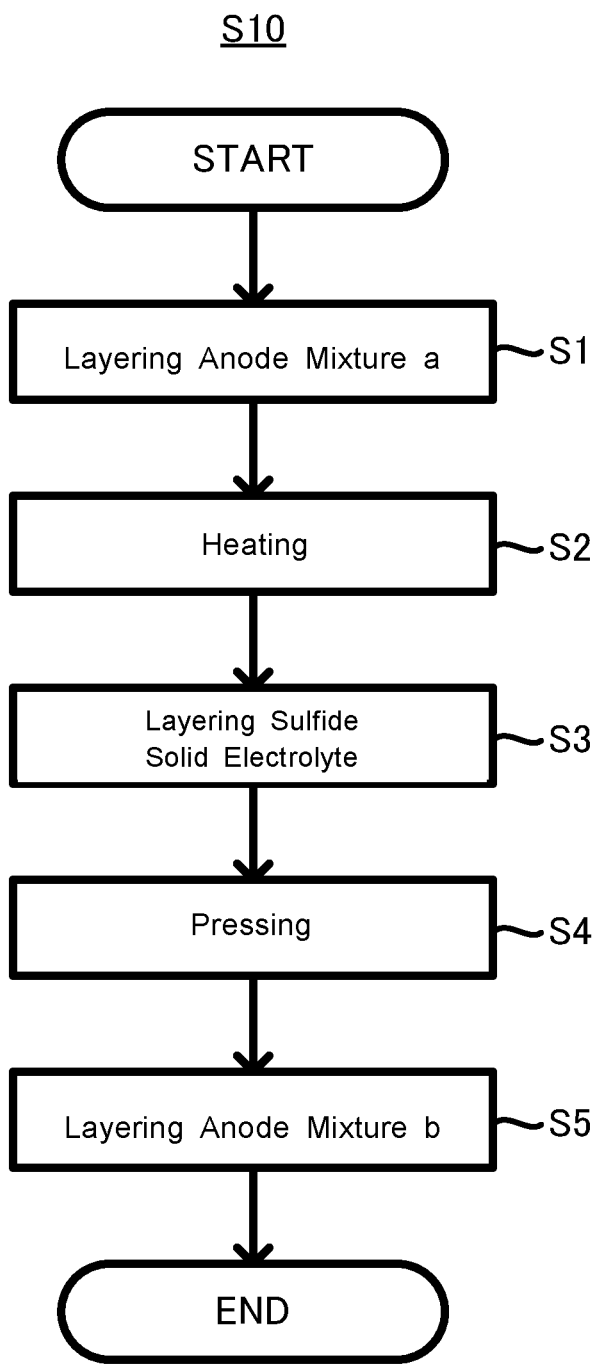
FIG. 1 is an explanatory flowchart of a method for producing a sulfide solid-state battery S10.
Figure 2A:
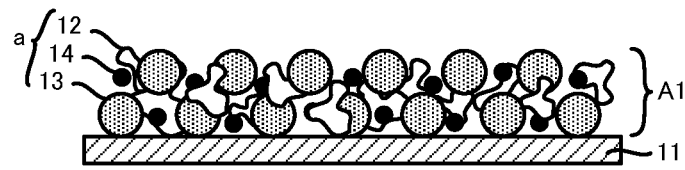
FIG. 2A is an explanatory schematic view of step S1 of the method for producing the sulfide solid-state battery S10 of FIG. 1.
Figure 2B:
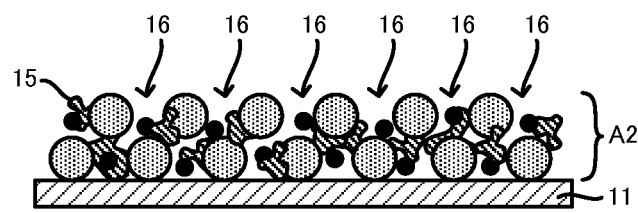
FIG. 2B is an explanatory schematic view of step S2 of the method for producing the sulfide solid-state battery S10 of FIG. 1.
Figure 2C:
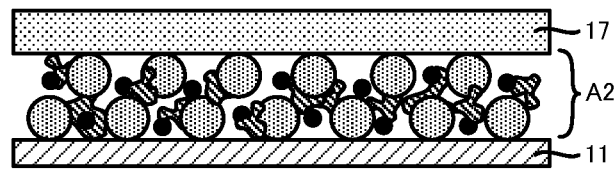
FIG. 2C is an explanatory schematic view of step S3 of the method for producing the sulfide solid-state battery S10 of FIG. 1.
Figure 2D:
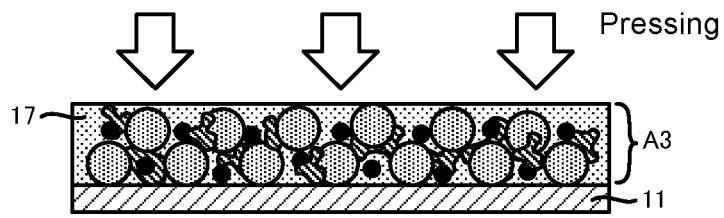
FIG. 2D is an explanatory schematic view of step S4 of the method for producing the sulfide solid-state battery S10 of FIG. 1.
Figure 2E:
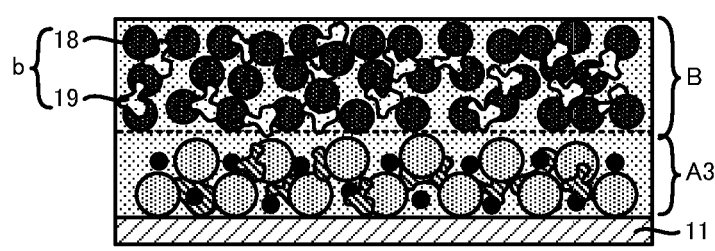
FIG. 2E is an explanatory schematic view of step S5 of the method for producing the sulfide solid-state battery S10 of FIG. 1.
Figure 3:
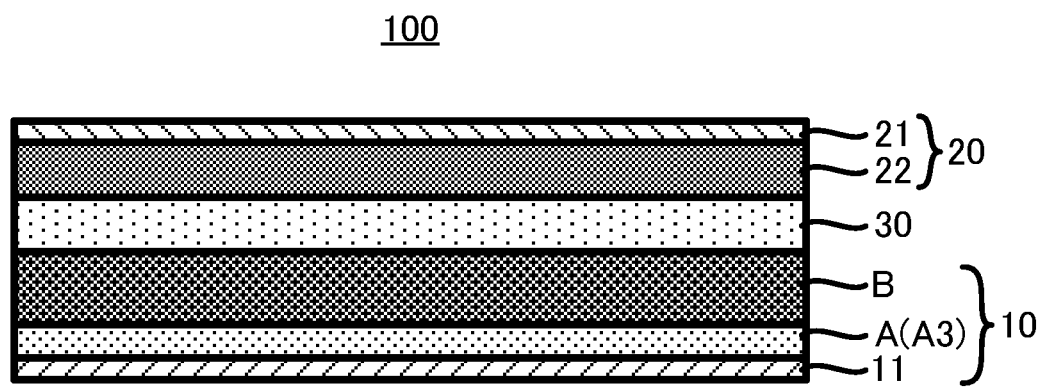
FIG. 3 is an explanatory schematic view of structure of a sulfide solid-state battery 100.

FIGS. 1 to 2E show a flow of a method for producing a sulfide solid-state battery S10. FIG. 3 schematically shows an example of the structure of a sulfide solid-state battery 100 produced according to the producing method S10. As shown in FIGS. 1 to 3, the method for producing a sulfide solid-state battery S10 is a method for producing a sulfide solid-state battery that includes a cathode 20, an anode 10, and a solid electrolyte layer 30 provided between the cathode 20 and the anode 10, the method comprising: a step S1 (FIG. 2A) of layering an anode mixture (a) over a surface of an anode current collector 11, to form the anode mixture layer A1, the anode mixture (a) containing a polyamic acid 12, and silicon-based active material 13 but not containing a sulfide solid electrolyte; a step S2 (FIG. 2B) of heating the anode mixture layer A1 to imidize the polyamic acid 12, to make an anode mixture layer A2 which contains a polyimide 15 and in which a void 16 is present; a step S3 (FIG. 2C) of layering a sulfide solid electrolyte 17 over a surface of the anode mixture layer A2 on an opposite side of the anode current collector 11; a step S4 (FIG. 2D) of pressing the anode mixture layer A2, over which the sulfide solid electrolyte 17 is layered, to insert the sulfide solid electrolyte 17 into the void 16 in the anode mixture layer A2, to make an anode mixture layer A3 that contains the sulfide solid electrolyte 17; and a step S5 (FIG. 2E) of layering an anode mixture (b) over a surface of the anode mixture layer A3, to form an anode mixture layer B, the anode mixture (b) containing carbonaceous active material 18 and binder 19.

1.1. Step S1

As shown in FIG. 2A, in the step S1, the anode mixture (a) is layered over a surface of the anode current collector 11, to form the anode mixture layer A1, the anode mixture (a) containing the polyamic acid 12, and the silicon-based active material 13 but not containing any sulfide solid electrolyte.

Any one known as an anode current collector for a sulfide solid-state battery can be employed as the anode current collector 11. The anode current collector 11 may be formed of metal foil, metal mesh, or the like. Examples of metals to constitute the anode current collector 11 include copper, nickel, iron, titanium, cobalt, zinc, and stainless steel. In some embodiments, the anode current collector 11 contains copper. The anode current collector 11 may be metal foil or base material which is plated with metal as described above or on which such metal is deposited, as well. The thickness of the anode current collector 11 is not specifically limited, and for example, is 0.1 µm to 1 mm, or 1 µm to 100 µm.

The anode mixture (a) contains the polyamic acid 12 and the silicon-based active material 13. On the other hand, the anode mixture (a) does not contain a sulfide solid electrolyte.

The polyamic acid 12 (polyamide acid) may be any one as long as a polyimide can be made therefrom by imidization (dehydration and cyclization) due to heating described later. Any one from which a polyimide that is known as binder for an electrode can be made can be employed as the polyamic acid 12. The polyamic acid 12 may be an aromatic or aliphatic compound. In some embodiments, a polyamic acid having an aromatic ring is useful from the viewpoint that when a polyimide is made from the polyamic acid 12, the polyimide can be a binder of high strength. The content of the polyamic acid 12 in the anode mixture (a) is not specifically limited, and may be properly determined according to the performance of a battery to be aimed. For example, the content of the polyamic acid 12 is 2 mass % to 20 mass % if the whole of the anode mixture (a) is 100 mass %. In some embodiments, the lower limit is no less than 4 mass %, and the upper limit is no more than 15 mass %.

The anode mixture (a) may contain any other component of binder in addition to the polyamic acid 12 as long as the above described problem can be solved. Examples thereof include styrene-butadiene rubber (SBR), carboxymethyl cellulose (CMC), acrylonitrile-butadiene rubber (ABR), butadiene rubber (BR), polyvinylidene fluoride (PVDF), and polytetrafluoroethylene (PTFE). In some embodiments, from the viewpoint that more outstanding effect can be brought about, the component of binder contained in the anode mixture (a) includes no less than 50 mass %, no less than 80 mass %, or no less than 90 mass % of the polyamic acid 12. In some embodiments, the component of binder contained in the anode mixture (a) consists of the polyamic acid 12.

The silicon-based active material 13 has only to be one that contains Si as a constituent element, and functions as an anode active material in a sulfide solid-state battery. For example, at least one of Si, Si alloys, and silicon oxides can be used. In some embodiments, Si or a Si alloy is used. The silicon-based active material 13 is easy to expand and contract due to charge and discharge. Generally, the volume changes approximately fourfold, which is easy to raise the above described problem of cutting off of ion paths. The shape of the silicon-based active material 13 is not specifically limited, and in some embodiments, for example, is in the form of a particle. The content of the silicon-based active material 13 in the anode mixture (a) is not specifically limited, and may be properly determined according to the performance of a battery to be aimed. For example, the content of the silicon-based active material 13 is 70 mass % to 97 mass % if the whole of the anode mixture (a) is 100 mass %. In some embodiments, the lower limit is no less than 80 mass %, and the upper limit is no more than 94 mass %.

The anode mixture (a) may contain any anode active material other than the silicon-based active material 13 in addition to the silicon-based active material 13 in view of, for example, contamination as long as the above problem can be solved. For example, carbon material such as graphite and hard carbon; various oxides such as lithium titanate; or metal lithium or a lithium alloy may be contained. In some embodiments, from the viewpoint that more outstanding effect can be brought about, the anode active material contained in the anode mixture (a) includes no less than 90 mass %, no less than 95 mass %, or no less than 99 mass % of the silicon-based active material 13. In some embodiments, the anode active material contained in the anode mixture (a) consists of the silicon-based active material 13.

As described later, the content of the anode active material in the anode mixture (a) is adjusted so that the volume ratio of the anode active material in the anode mixture layer A3, which is finally formed, is no more than 60%.

The anode mixture (a) may contain any component other than the polyamic acid 12 and the silicon-based active material 13 in addition to them. For example, as shown in FIG. 2A, the anode mixture (a) contains a conductive additive 14 in addition to the polyamic acid 12 and the silicon-based active material 13.

Any one known as a conductive additive employed in a sulfide solid-state battery can be employed as the conductive additive 14. For example, carbon material such as acetylene black (AB), Ketjen black (KB), vapor grown carbon fiber (VGCF), carbon nanotubes (CNT), carbon nanofiber (CNF), and graphite; or metallic material such as nickel, aluminum, and stainless steel can be used. One conductive additive may be used individually, or two or more conductive additives may be mixed to be used as the conductive additive 14. Any shape such as powder and fiber can be employed as the shape of the conductive additive 14. The content of the conductive additive 14 in the anode mixture (a) is not specifically limited, and may be properly determined according to the performance of a battery to be aimed. In some embodiments, for example, the content of the conductive additive 14 is 2 mass % to 10 mass % if the whole of the anode mixture (a) is 100 mass %. In some embodiments, the lower limit is no less than 3 mass %, and the upper limit is no more than 7 mass %.

The way of layering the anode mixture (a) over the surface of the anode current collector 11 is not specifically restricted. One may apply the anode mixture (a) to the surface of the anode current collector 11 in a wet process, and dry and optionally press-mold the collector 11, to form the anode mixture layer A1 over the surface of the anode current collector 11. One may also press-mold the anode mixture (a) together with the anode current collector 11 in a dry process, to form the anode mixture layer A1 over the surface of the anode current collector 11. In the case of a wet process, the anode mixture (a) is dispersed over solvent or the like, to be slurry. In this case, various organic solvents can be used as solvent. In some embodiments, for example, N-methylpyrrolidone (NMP) is used.

The thickness of the anode mixture layer A1 formed over the surface of the anode current collector 11 (thickness after drying to remove the solvent in the case of a wet process, and hereinafter the same will be applied) is not specifically limited. As described later, the thickness of the anode mixture layer A1 is adjusted so that the thickness of the anode mixture layer A3, which is finally formed, is no more than 3 μm.

1.2. Step S2

As shown in FIG. 2B, in the step S2, the anode mixture layer A1 is heated to imidize the polyamic acid 12, to make the anode mixture layer A2 which contains the polyimide 15 and in which the void 16 is present.

In order to imidize the polyamic acid 12 by dehydration and cyclization, the heating temperature in the step S2 is 200° C. or higher in some embodiments. In view of further improving the strength as the polyimide 15, the heating temperature may be 400° C. or higher. As described above, the anode mixture (a) does not contain a sulfide solid electrolyte. Thus, in the step S2, even if the heating temperature is high, there is no anxiety about decomposition of a sulfide solid electrolyte, or reaction between a sulfide solid electrolyte and the anode current collector 11. The heating atmosphere is not specifically limited, and for example, is an atmosphere of an inert gas such as argon and nitrogen in some embodiments. The heating time is not specifically limited as well as long as the above described imidization sufficiently progresses. The heating means used in the step S2 is not specifically limited, and a known heating means may be used. The polyimide 15 has only to include an imide bond. The polyimide 15 may also include a bond other than an imide bond as long as the above described problem can be solved. In some embodiments, for example, the polyimide 15 is at least one of a polyimide and a polyamide-imide.

In the anode mixture layer A2, the void 16 is constituted of a space formed between particles of the silicon-based active material 13, a space formed by the volume reduction of the polyamic acid 12 due to dehydration and cyclization, or the like. That is, the void 16 is naturally formed in the anode mixture layer A2 through the steps S1 and S2, and no special operation for forming the void 16 is necessary in the step S1 or S2. The voidage in the anode mixture layer A2 is not specifically limited.

The thickness of the anode mixture layer A2 is not specifically limited. For example, the anode mixture layer A2 has a thickness corresponding to that of the anode mixture layer A1.

1.3. Step S3

As shown in FIG. 2C, in the step S3, the sulfide solid electrolyte 17 is layered over a surface of the anode mixture layer A2 on an opposite side of the anode current collector 11.

Any sulfide applied as a solid electrolyte for a sulfide solid-state battery can be employed as the sulfide solid electrolyte 17. Examples thereof include $Li_2S$—$P_2S_5$, $Li_2S$—$SiS_2$, LiI—$Li_2S$—$SiS_2$, LiI—$Si_2S$—$P_2S_5$, LiI—LiBr—$Li_2S$—$P_2S_5$, LiI—$Li_2S$—$P_2S_5$, LiI—$Li_2O$—$Li_2S$—$P_2S_5$, LiI—$Li_2S$—$P_2O_5$, and LiI—$Li_3PO_4$—$P_2S_5$. In some embodiments, a sulfide solid electrolyte containing $Li_2S$—$P_2S_5$ is used. One sulfide solid electrolyte may be used alone, or at least two sulfide solid electrolytes may be mixed to be used as the sulfide solid electrolyte 17.

The way of layering the sulfide solid electrolyte 17 over the surface of the anode mixture layer A1 is not specifically restricted. One may apply the sulfide solid electrolyte 17 to the surface of anode mixture layer A1 in a wet process, and dry the layer A1, to layer the sulfide solid electrolyte 17 over the surface of the anode mixture layer A1. One may also accumulate the sulfide solid electrolyte 17 over the surface of the anode mixture layer A1 in a dry process, to layer the sulfide solid electrolyte 17 over the surface of the anode mixture layer A1. In the case of a wet process, the sulfide solid electrolyte is dispersed over solvent or the like, to be slurry. In this case, various organic solvents can be used as solvent. In some embodiments, for example, heptane is used.

The thickness of a layer of the sulfide solid electrolyte 17 formed over the surface of the anode mixture layer A1 is not specifically limited. The amount of the sulfide solid electrolyte 17 to be layered may be determined according to the thickness of the anode mixture layer A2, the volume of the voids 16 included in the anode mixture layer A2, etc.

1.4. Step S4

As shown in FIG. 2D, in the step S4, the anode mixture layer A2, over which the sulfide solid electrolyte 17 is layered, is pressed to insert the sulfide solid electrolyte 17 into the void 16 in the anode mixture layer A2, to make the anode mixture layer A3 that contains the sulfide solid electrolyte 17.

The sulfide solid electrolyte 17 easily deforms to some extent due to pressure. Thus, the sulfide solid electrolyte 17 can be easily inserted into voids in the anode mixture layer A2 by the pressing in the step S4. The pressure in the step S4 is not specifically limited, and is such that the sulfide solid electrolyte 17 can be inserted into the voids 16. In some embodiments, for example, the pressure is no less than 2 t/cm in linear pressure. The atmosphere in the step S4 is not specifically limited, and for example, is an inert gas atmosphere. The pressing time in the step S4 is not specifically limited as well. The pressing means used in the step S4 is not specifically limited, and a known pressing means may be used. In some embodiments, for example, the sulfide solid electrolyte 17 is thrust into the anode mixture layer A2 with a roll press or the like.

In an anode mixture layer, the amount of a sulfide solid electrolyte is increased while the amount of active material is reduced, which makes it possible to further prevent the problem of cutting off of ion paths due to expansion/contraction of the active material. In view of this, the volume ratio of the anode active material in the anode mixture layer A3 is no more than 60%. In addition, the volume ratio of the sulfide solid electrolyte in the anode mixture layer A3 is no less than 20%.

The thickness of the anode mixture layer A3 is not specifically limited, and for example, can be 0.1 μm to 10 μm. In view of securing more ion paths during charge and discharge, the sulfide solid electrolyte 17 is arranged so as to disperse from the surface of the anode mixture layer A3 to the whole of the inside thereof. In this point, if the anode mixture layer A2 is too thick, it is sometimes difficult to diffuse the sulfide solid electrolyte 17 all over the anode mixture layer A3 after the pressing. According to the new findings of the inventor of the present application, if the thickness of the anode mixture layer A3, which is finally formed, is no more than a certain thickness, the sulfide solid electrolyte 17 is arranged so as to disperse from the surface of the anode mixture layer A3 to the whole of the inside. In some embodiments, the thickness of the anode mixture layer A3 is no more than 3 μm. In some embodiments, the anode according to the present application can be said to be one to which a minute amount of the silicon-based active material that is a constituent of the anode mixture layer A3 is added in addition to the carbonaceous active material that is a constituent of the anode mixture layer B, for example. As described above, even an extremely thin thickness of the anode mixture layer A3 and a small amount of adding the silicon-based active material bring about a large effect on improvement of energy density.

1.5. Step S5

As shown in FIG. 2E, in the step S5, the anode mixture (b) is layered over a surface of the anode mixture layer A3, to form the anode mixture layer B, the anode mixture (b) containing the carbonaceous active material 18 and the binder 19.

The anode mixture (b) contains the carbonaceous active material 18 and the binder 19.

The carbonaceous active material 18 has only to be one that contains C as a constituent element, and functions as an anode active material in a sulfide solid-state battery. For example, graphite or hard carbon can be used. Compared to the silicon-based active material 13, expansion/contraction of the volume during charge and discharge is small in the carbonaceous active material 18, and the problem of cutting off of ion paths is hard to arise. The shape of the carbonaceous active material 18 is not specifically limited, and for example, is in the form of a particle. The content of the carbonaceous active material 18 in the anode mixture (b) is not specifically limited, and may be properly determined according to the performance of a battery to be aimed. In some embodiments, for example, the content of the carbonaceous active material 18 is 50 mass % to 90 mass % if the whole of the anode mixture (b) is 100 mass %. In some embodiments, the lower limit is no less than 70 mass %, and the upper limit is no more than 80 mass %.

The anode mixture (b) may contain any anode active material other than the carbonaceous active material 18 in addition to the carbonaceous active material 18 in view of, for example, contamination as long as the above problem can be solved. For example, various oxides such as lithium titanate; or metal lithium or a lithium alloy may be contained. It is noted that in the anode mixture (b), the silicon-based active material 13 is contained as little as possible. From the viewpoint that more outstanding effect can be brought about, the anode active material contained in the anode mixture (b) includes no less than 90 mass %, no less than 95 mass %, or no less than 98 mass % of the carbonaceous active material 18. In some embodiments, the anode active material contained in the anode mixture (b) consists of the carbonaceous active material 18.

Any known one as binder employed in a sulfide solid-state battery can be employed as the binder 19. It is noted that in the anode mixture (b), the polyamic acid 12 is contained as little as possible. In some embodiments, the binder contained in the anode mixture layer A3 is different from the binder 19 contained in the anode mixture (b) (anode mixture layer B). This is because, as obvious from the above described problem and effect, imidization due to heating becomes difficult if the polyamic acid 12 is contained in the anode mixture (b), which is substantially meaningless. This is also because the strength and elasticity of binder are not necessary so much in the anode mixture layer B unlike the anode mixture layer A3 since the carbonaceous active material 18, whose expansion/contraction during charging is small, is used in the anode mixture (b). For example, at least one selected from styrene-butadiene rubber (SBR), carboxymethyl cellulose (CMC), acrylonitrile-butadiene rubber (ABR), butadiene rubber (BR), polyvinylidene fluoride (PVDF), polytetrafluoroethylene (PTFE), etc. can be used as the binder 19. The content of the binder 19 in the anode mixture (b) is not specifically limited, and may be properly determined according to the performance of a battery to be aimed.

The anode mixture (b) may contain any component other than the carbonaceous active material 18 and the binder 19 in addition to them. In some embodiments, the anode mixture (b) contains a sulfide solid electrolyte in addition to the carbonaceous active material 18 and the binder 19 because better ion paths are secured. The sulfide solid electrolyte contained in the anode mixture (b) may be either the same as or difficult from the sulfide solid electrolyte 17 contained in the anode mixture layer A3. In the anode mixture (b), the content of the other components is not specifically limited.

The way of layering the anode mixture (b) over the surface of the anode mixture layer A3 is not specifically restricted. One may apply the anode mixture (b) to the surface of the anode mixture layer A3 in a wet process, and dry and optionally press-mold the layer A3, to form the anode mixture layer B over the surface of the anode mixture layer A3. One may also press-mold the anode mixture (b) together with the anode mixture layer A3 in a dry process, to form the anode mixture layer B over the surface of the anode mixture layer A3. In the case of a wet process, the anode mixture (b) is dispersed over solvent or the like, to be slurry. In this case, various organic solvents can be used as solvent. In some embodiments, heptane is used.

In the anode mixture layer B, the carbonaceous active material 18 is used as the anode active material. Thus, as described above, expansion/contraction of the anode active material during charge and discharge is small, and ion paths are hard to cut off. Therefore, the amount of the anode active material can be increased in the anode mixture layer B unlike the anode mixture layer A3.

When the anode mixture layer A3 is compared with the anode mixture layer B, the amount (volume ratio) of the anode active material in the anode mixture layer B is larger than the anode mixture layer A3 in view of bringing about more outstanding effect. In some embodiments, when the volume ratio of the anode active material in the anode mixture layer A3 is $\alpha$ (%) and that in the anode mixture layer B is $\beta$ (%), the relation of $10 \leq \beta - \alpha$ is satisfied. Whereby, the amount of the sulfide solid electrolyte is relatively increased, and the above described problem of cutting off of ion paths can be more easily prevented in the anode mixture layer A3 that contains the silicon-based active material 13, whose expansion/contraction is large. In a solid-state battery as this disclosure, the volume ratio of active material in a mixture layer can be easily set by the amount of a solid electrolyte prepared in the mixture layer or the like.

The thickness of the anode mixture layer B is not specifically limited, and for example, is 0.1 μm to 1 mm, or 1 μm to 100 μm. Or, the thickness can be thicker than this for improving capacity. In some embodiments, the anode mixture layer B is thicker than the anode mixture layer A3. In some embodiments, thicknesses of the anode mixture layers A3 and B are determined so that the capacity of the anode 10 is larger than that of the cathode 20.

1.6. Addition

As shown in FIG. 3, the sulfide solid-state battery 100 includes the cathode 20 and the solid electrolyte layer 30 in addition to the anode 10 produced according to the steps S1 to S5. The ways of producing the cathode 20 and the solid electrolyte layer 30 are publicly known.

1.6.1. Cathode 20

Although the structure of the cathode 20 in the sulfide solid-state battery 100 is obvious for the person skilled in the art, hereinafter an example thereof will be described. The cathode 20 usually includes a cathode mixture layer 22 that contains a cathode active material, and as optional components, a solid electrolyte, binder, a conductive additive and other additives (such as thickener). In some embodiments, a cathode current collector 21 that is in contact with the cathode mixture layer 22 is included.

The cathode current collector 21 may be formed of metal foil, metal mesh, or the like. Examples of metals that can constitute the cathode current collector include stainless steel, nickel, chromium, gold, platinum, aluminum, iron, titanium, and zinc. The cathode current collector 21 may be also metal foil or base material which is plated with metal as described above or on which such metal is deposited.

Any known one as a cathode active material for a sulfide solid-state battery can be employed as the cathode active material contained in the cathode mixture layer 22. One may select two materials different in electric potential at which predetermined ions are stored and released (charge and discharge potential) among known active materials, to use a material displaying nobler potential than that of the above described anode active material as the cathode active material. For example, when a lithium ion battery is configured, a lithium-containing oxide such as lithium cobaltate, lithium nickelate, Li(Ni,Mn,Co)O$_2$ (Li$_{1+\alpha}$Ni$_{1/3}$Mn$_{1/3}$Co$_{1/3}$O$_2$), lithium manganate, spinel lithium composite oxides, lithium titanate, and lithium metal phosphates (LiMPO$_4$ where M is at least one selected from Fe, Mn, Co and Ni) can be used as the cathode active material. One may be used alone, or two or more may be mixed to be used as the cathode active material. The cathode active material may have a coating layer of lithium niobate, lithium titanate, lithium phosphate, or the like over the surface thereof. The shape of the cathode active material is not specifically limited, and for example, is in the form of a particle or a thin film. The content of the cathode active material in the cathode mixture layer is not specifically limited, and may be equivalent to the amount of a cathode active material contained in a cathode mixture layer of a conventional sulfide solid-state battery.

Any known one as a solid electrolyte for a sulfide solid-state battery can be employed as the solid electrolyte. In some embodiments, for example, a sulfide solid electrolyte as described above is employed. An inorganic solid electrolyte other than the sulfide solid electrolyte may be contained in addition to the sulfide solid electrolyte as long as a desired effect can be brought about. The same ones as in the anode 10 can be employed as the conductive additive and the binder as well. One may be used alone, or two or more may be mixed to be used as the solid electrolyte (the conductive additive, the binder). The shapes of the solid electrolyte and the conductive additive are not specifically limited, and for example, are in the form of a particle. The contents of the solid electrolyte, the conductive additive, and the binder in the cathode mixture layer are not specifically limited, and may be equivalent to the amounts of a solid electrolyte, a conductive additive, and binder contained in a cathode mixture layer of a conventional sulfide solid-state battery.

The cathode 20 having the structure described above can be easily produced by passing through processes such as putting the cathode active material, and the solid electrolyte, the binder and the conductive additive which are optionally contained into solvent, and kneading them to obtain a slurry electrode composition, and thereafter applying this electrode composition to a surface of the cathode current collector and drying the surface. The cathode can be produced by not only such a wet process, but also a dry process. In some embodiments, when the cathode mixture layer in the form of a sheet is formed over the surface of the cathode current collector as described above, the thickness of the cathode mixture layer is, for example, 0.1 μm to 1 mm, or 1 μm to 100 μm.

1.6.2. Solid Electrolyte Layer 30

While the structure of the solid electrolyte layer 30 in the sulfide solid-state battery 100 is obvious for the person skilled in the art, hereinafter one example will be described. The solid electrolyte layer 30 contains a solid electrolyte, and optionally binder. In some embodiments, for example, a sulfide solid electrolyte as described above is employed as the solid electrolyte. An inorganic solid electrolyte other than the sulfide solid electrolyte may be contained in addition to the sulfide solid electrolyte as long as a desired effect can be brought about. The same one as the above described binder can be properly selected to be used as the binder. The content of each component in the solid electrolyte layer 30 may be the same as a conventional one. The shape of the solid electrolyte layer 30 may be the same as a conventional one as well. In some embodiments, the solid electrolyte layer 30 is in the form of a sheet. The solid electrolyte layer 30 in the form of a sheet can be easily produced by passing through processes such as putting the solid electrolyte, and optionally the binder into solvent, and kneading them to obtain a slurry electrolyte composition, and thereafter applying this electrolyte composition to a surface of base material or to (a) surface(s) of the cathode mixture layer and/or the anode mixture layer, and drying the surface(s). In some embodiments, the thickness of the solid electrolyte layer 30 is, for example, 0.1 μm to 300 μm, or 0.1 μm to 100 μm.

1.6.3. Other Members

Needless to say, the sulfide solid-state battery 100 may include necessary terminals, battery case, etc. in addition to the anode 10, the cathode 20, and the solid electrolyte layer 30. These members are publicly known, and detailed description thereof is omitted here.

As described above, in the producing method S10 of this disclosure, the sulfide solid electrolyte 17 is not contained in the anode mixture layer A1 or A2 in the stage of heating the polyamic acid 12 to make the polyimide 15. Thus, the sulfide solid electrolyte 17 does not decompose due to the heat treatment, or the sulfide solid electrolyte 17 does not react with the anode current collector 11.

In the producing method S10 of this disclosure, the sulfide solid electrolyte 17 is pressed and thrust into the anode mixture layer A2, which can cause the sulfide solid electrolyte 17 to be arranged around the silicon-based active material 13 in the anode mixture layer A3. Therefore, in the anode mixture layer A3, many ion paths can be secured, and ion paths are hard to cut off even if the silicon-based active material 13 expands/contracts during charge and discharge.

Further, while it is sometimes difficult to obtain the capacity per electrode volume necessary for a battery of a high capacity for the anode mixture layer A3 only, in the producing method S10 of this disclosure, the capacity of the anode can be increased by further layering the anode mixture layer B over the surface of the anode mixture layer A3.

2. Sulfide Solid-State Battery

The sulfide solid-state battery 100 produced according to the producing method S10 of this disclosure has, for example, the following structure in an embodiment: that is, as shown in FIGS. 1 to 3, the sulfide solid-state battery 100 includes the cathode 20, the anode 10, and the solid electrolyte layer 30 provided between the cathode 20 and the anode 10. In the sulfide solid-state battery 100, the anode 10 includes the anode current collector 11, the anode mixture layer A provided over the surface of the anode current collector 11 (corresponding to the above described anode mixture layer A3), and the anode mixture layer B provided over the surface of the anode mixture layer A on the opposite side of the anode current collector 11, the anode mixture layer A contains the silicon-based active material 13, the polyimide 15 and the sulfide solid electrolyte 17, and the anode mixture layer B contains the carbonaceous active material 18 and the binder 19. In some embodiments, the thickness of the anode mixture layer A is no more than 3 μm.

In some embodiments of the sulfide solid-state battery 100, the anode current collector 11 contains copper. When the volume ratio of the anode active material in the anode mixture layer A is α (%) and that in the anode mixture layer B is β (%), the relation of 10≤β−α is satisfied. The volume ratio of the anode active material in the anode mixture layer A is no more than 60%. The binder contained in the anode mixture layer A is different from the binder 19 contained in the anode mixture layer B. In some embodiments, the binder 19 contained in the anode mixture layer B is styrene-butadiene rubber.

According to the producing method S10 of this disclosure, such a problem as decomposition of the sulfide solid electrolyte, and reaction between the sulfide solid electrolyte and the anode current collector can be solved irrelevantly to the thickness of the anode mixture layer A (A3). However, as described above, if the anode mixture layer A is too thick, it is sometimes impossible to arrange the sulfide solid electrolyte 17 all over the anode mixture layer A. In this point, in the sulfide solid-state battery 100 according to an embodiment, the thickness of the anode mixture layer A is no more than 3 μm, which makes it possible to easily arrange the sulfide solid electrolyte 17 all over the anode mixture layer A, secure more ion paths, and further improve cycle characteristics (capacity retention after a charge/discharge cycle).

EXAMPLES

Example 1

1. Making Sulfide Solid-State Battery 1.1. Making Cathode Active Material $LiNi_{1/3}Mn_{1/3}Co_{1/3}O_2$ particles (mean particle size ($D_{50}$): 6 μm) were prepared. $LiNbO_3$ was coated over surfaces of the particles by the sol-gel process. Specifically, an ethanol solution that dissolved equimolar $LiOC_2H_5$ and $Nb(OC_2H_5)_5$ was coated over surfaces of the particles under an atmospheric pressure using a tumbling fluidized coating machine (SFP-01 manufactured by Powrex Corporation). The processing time was adjusted so that the thickness of this coating was 5 nm. Thereafter, the coated particles were heat-treated at 350° C. under an atmospheric pressure for 1 hour, to obtain a cathode active material.

1.2. Making Cathode

The obtained cathode active material and a sulfide solid electrolyte (LiI—Li$_2$O—Li$_2$S—P$_2$S$_5$) were weighed so that their mass ratio was: cathode active material:sulfide solid electrolyte=75:25. Further, to 100 parts by mass of the cathode active material, 4 parts by mass of a PVDF based binder (manufactured by Kureha Corporation) and 6 parts by mass of acetylene black as a conductive additive were weighed. They were prepared in butyl butyrate so that the solid content was 70 mass %, and were kneaded with a stirrer, to obtain a cathode paste. An aluminum foil of 15 μm in thickness was coated with the obtained cathode paste according to a blade coating method using an applicator so that the weight of the paste was 30 mg/cm$^2$, and the foil was dried at 120° C. for 30 minutes, to obtain a cathode including a cathode mixture layer over the aluminum foil.

1.3. Making Solid Electrolyte Layer

Each of 95 parts by mass of a sulfide solid electrolyte same as the above, and 5 parts by mass of butylene rubber as binder was weighed. They were prepared in heptane solvent so that the solid content was 70 mass %, and were stirred with an ultrasonic dispersive device (UH-50 manufactured by SMT Corporation) for 2 minutes, to obtain a solid electrolyte paste. Base material (aluminum foil) was coated with the obtained solid electrolyte paste in the same way as in the case of the cathode paste so that the weight of the paste was 60 mg/cm$^2$, and the material was air-dried, and thereafter was dried at 100° C. for 30 minutes, to obtain the base material including a solid electrolyte layer.

1.4. Making Anode

1.4.1. Making Anode Mixture Layer A

Silicon microparticles (mean particle size: 1 μm), NMP solution containing a polyamic acid (solid content: 10 mass %), and acetylene black were mixed so that their mass ratio was 85:100:5, and NMP was further added thereto so that the solid content was 55 mass %, to obtain a pasty anode mixture (a). The obtained anode mixture (a) was applied to a copper foil of 15 μm in thickness so that the weight thereof was 0.3 mg/cm$^2$, to form an anode mixture layer A1. Next, the polyamic acid in the anode mixture layer A1 was imidized by heating at 400° C. for 30 minutes under an argon atmosphere, to make an anode mixture layer A2 which contained a polyimide and in which voids were present. Next, the above described solid electrolyte paste was applied to the surface of the anode mixture layer A2 on the opposite side of the copper foil so that the weight thereof was 0.4 mg/cm$^2$, to layer the sulfide solid electrolyte over the surface of the anode mixture layer A2. Next, the sulfide solid electrolyte was inserted into voids in the anode mixture layer A2 by pressing with a roll press at 1 ton/cm$^2$, to make an anode mixture layer A3 containing the sulfide solid electrolyte. The thickness of the anode mixture layer A3 was 2.9 μm. The volume ratio of the anode active material in the anode mixture layer A3 was 45%.

1.4.2. Making Anode Mixture Layer B

Each of 65 parts by mass of carbonaceous active material (natural graphite, mean particle size: 20 μm), 33 parts by mass of a sulfide solid electrolyte same as the above, and 2 parts by mass of styrene-butadiene rubber was mixed in heptane solution so that the solid content was 65 mass %, and was kneaded with a stirrer, to obtain a pasty anode mixture (b). A surface of the anode mixture layer A3 was coated with the obtained anode mixture (b) according to a blade coating method so that the weight of the mixture b was 11.8 mg/cm$^2$. Next, the layer A3 was air-dried, and thereafter dried at 100° C. for 30 minutes. Thereafter, an anode that included the anode mixture layer A (A3) and an anode mixture layer B over a surface of an anode current collector was obtained by pressing with a roll press at 1 ton/cm$^2$. The volume ratio of the anode active material in the anode mixture layer B was 63%.

1.5. Layering Cathode, Solid Electrolyte Layer, and Anode

The above described solid electrolyte layer of 1 cm$^2$ in area was punched out, and pressed at 1 ton/cm$^2$. The cathode was piled on one face of the pressed solid electrolyte layer (face on the opposite side of the base material), to be pressed at 1 ton/cm$^2$. The base material was peeled. The anode was piled on the face where the base material was peeled, to be pressed at 6 ton/cm$^2$, to obtain a laminate consisting of the cathode/the solid electrolyte layer/the anode. The obtained laminate was hermetically shut up in an aluminum laminated film having terminals, to obtain a sulfide solid-state battery for evaluation.

2. Cycle Test of Sulfide Solid-State Battery

The obtained sulfide solid-state battery was subjected to a charge/discharge cycle under the following conditions, to measure the capacity retention at the 100th cycle to the capacity at the first cycle (cycle retention). The result is shown in the following Table 1.

charge conditions: 4.1 V-CCCV, current rate: 15 mA, 1 mA cut discharge conditions: CC, 2.5 V cut, current rate: 15 mA

Example 2

A sulfide solid-state battery was made, and was subjected to a cycle test in the same manner as in Example 1 except that the silicon-based active material in the anode mixture (a) was changed to SiO whose mean particle size was 1 μm. The result is shown in the following Table 1.

Example 3

A sulfide solid-state battery was made, and was subjected to a cycle test in the same manner as in Example 1 except that the binder in the anode mixture layer A3 was changed from a polyimide to a polyamide-imide. The result is shown in the following Table 1.

Reference Example 1

A sulfide solid-state battery was made, and was subjected to a cycle test in the same manner as in Example 1 except that the weight and the thickness about the anode mixture (a) were 1.5 times those in Example 1, and the thickness of the anode mixture layer A3 was changed to 4.2 μm. The result is shown in the following Table 1.

Comparative Example 1

A sulfide solid-state battery was made, and was subjected to a cycle test in the same manner as in Example 1 except that the binder in the anode mixture (a) was changed to PVDF, and the heating temperature was changed to 100° C. The result is shown in the following Table 1.

Comparative Example 2

A sulfide solid-state battery was made, and was subjected to a cycle test in the same manner as in Example 1 except that the sulfide solid electrolyte was layered over a surface of the anode mixture layer A1, and was pressed to be inserted into voids in the anode mixture layer A1, and thereafter the polyamic acid in the anode mixture layer A1 was imidized by heating at 400° C. The result is shown in the following Table 1.

Comparative Example 3

A sulfide solid-state battery was made, and was subjected to a cycle test in the same manner as in Example 1 except that the anode mixture layer B was formed over a surface of the copper foil, and the anode mixture layer A3 was formed over the surface of the anode mixture layer B in the same flow as described above. The result is shown in the following Table 1.

In the following Table 1, the anode mixture layer A is expressed as "A layer", and the anode mixture layer B is expressed as "B layer".

able to be made, and cycle characteristics superior to Comparative Example 1 as a battery were able to be secured. However, the cycle retention was lowered compared to Examples 1 to 3. It is believed that the sulfide solid electrolyte was not able to be press-fit into the whole of the anode mixture layer A3, which led to faults in ion paths. From the comparison among Examples 1 to 3 and Reference Example 1, it was found that the thickness of the anode mixture layer A3 is no more than 3 μm.

INDUSTRIAL APPLICABILITY

A sulfide solid-state battery produced according to the producing method of this disclosure can be used in a wide range of power sources such as a small-sized power source for portable devices and an onboard large-sized power source.

TABLE 1

| | Conditions for Making Anode | | | | | | | | | |
|---|---|---|---|---|---|---|---|---|---|---|
| | Active Material in A Layer | Active Material in B Layer | Active Material in A Layer/Active Material in B Layer (Mass Ratio) | Binder in A Layer | Heating Temp. of A Layer [° C.] | Thickness of A Layer [μm] | Volume Ratio of Active Material in A Layer [%] | Volume Ratio of Active Material in B Layer [%] | Total Weight in A and B Layers [mg/cm$^2$] | Cycle Retention [%] |
| Ex. 1 | Si | Natural Graphite | 0.03 | Polyimide | 400 | 2.9 | 52 | 63 | 12.2 | 87 |
| Ex. 2 | SiO | Natural Graphite | 0.03 | Polyimide | 400 | 2.9 | 52 | 63 | 12.2 | 89 |
| Ex. 3 | Si | Natural Graphite | 0.03 | Polyamide-imide | 400 | 2.9 | 52 | 63 | 12.2 | 86 |
| Ref. Ex. 1 | Si | Natural Graphite | 0.05 | Polyimide | 400 | 4.2 | 44 | 63 | 12.6 | 63 |
| Comp. Ex. 1 | Si | Natural Graphite | 0.03 | PVDF | 100 | 2.9 | 52 | 63 | 12.2 | 52 |
| Comp. Ex. 2 | Si | Natural Graphite | 0.03 | Polyimide | 400 | 2.9 | 52 | 63 | 12.2 | Impossible to Make Battery |
| Comp. Ex. 3 | Si | Natural Graphite | 0.03 | Polyimide | 400 | 2.9 | 52 | 63 | 12.2 | Impossible to Make Battery |

As is clear from the comparison between Example 1 and Comparative Example 1, cycle characteristics were outstandingly improved by using a polyimide instead of PVDF as the binder in the anode mixture layer A (A3) that contained the silicon-based active material. A polyimide has higher strength and higher elasticity than PVDF. Thus, it is believed that extraction/contraction of the silicon-based active material during charge and discharge was able to be suppressed.

As is clear from the results of Comparative Examples 2 and 3, when the anode mixture layer containing the sulfide solid electrolyte was heated at 400° C. in the state of being in contact with the anode current collector, the anode current collector chemically reacted with the sulfide solid electrolyte, which led to peel between the mixture layer and the anode current collector, which made it impossible to make the anode well, and to evaluate the battery.

As is clear from the results of Examples 1 to 3, after the heat treatment, the sulfide solid electrolyte was press-fit in the anode mixture layer A3 that was in contact with the anode current collector, which made it possible to suppress chemical reaction between the anode current collector and the sulfide solid electrolyte, to properly make the anode, and which resulted in obtainment of the sulfide solid-state battery of an excellent cycle retention.

As is clear from the result of Reference Example 1, when the anode mixture layer A (A3) was thick, the anode was

What is claimed is:

1. A method for producing a sulfide solid-state battery that includes a cathode, an anode, and a solid electrolyte layer provided between the cathode and the anode, the method comprising:

layering an anode mixture (a) over a surface of an anode current collector, to form an anode mixture layer A1, the anode mixture (a) containing a polyamic acid, and silicon-based active material but not containing a sulfide solid electrolyte;

heating the anode mixture layer A1 to imidize the polyamic acid, to make an anode mixture layer A2 which contains a polyimide and in which a void is present;

layering a sulfide solid electrolyte over a surface of the anode mixture layer A2 on an opposite side of the anode current collector;

pressing the anode mixture layer A2, over which the sulfide solid electrolyte is layered, to insert the sulfide solid electrolyte into the void in the anode mixture layer A2, to make an anode mixture layer A3 that contains the sulfide solid electrolyte; and layering an anode mixture (b) over a surface of the anode mixture layer A3, to form an anode mixture layer B, the anode mixture (b) containing carbonaceous active material and binder.

2. The method according to claim 1, wherein the anode mixture layer A3 is no more than 3 µm in thickness.

3. The method according to claim 1, wherein the anode current collector contains copper.

4. The method according to claim 1, wherein
a relation of $10 \leq \beta - \alpha$ is satisfied when a volume ratio of an anode active material in the anode mixture layer A3 is $\alpha$ (%), and a volume ratio of an anode active material in the anode mixture layer B is $\beta$ (%).

5. The method according to claim 1, wherein the volume ratio of the anode active material in the anode mixture layer A3 is no more than 60%.

6. The method according to claim 1, wherein the binder contained in the anode mixture layer B is different from a binder contained in the anode mixture layer A3.

7. The method according to claim 6, wherein the binder contained in the anode mixture layer B is styrene-butadiene rubber.

8. A sulfide solid-state battery that includes a cathode, an anode, and a solid electrolyte layer provided between the cathode and the anode, wherein
the anode comprises:
an anode current collector;
an anode mixture layer A that is provided over a surface of the anode current collector; and
an anode mixture layer B that is provided over a surface of the anode mixture layer A on an opposite side of the anode current collector,
the anode mixture layer A comprises:
silicon-based active material;
a polyimide; and
a sulfide solid electrolyte,
the anode mixture layer B comprises:
carbonaceous active material; and
binder, and
the anode mixture layer A is no more than 3 µm in thickness.

9. The sulfide solid-state battery according to claim 8, wherein the anode current collector contains copper.

10. The sulfide solid-state battery according to claim 8, wherein
a relation of $10 \leq \beta - \alpha$ is satisfied when a volume ratio of an anode active material in the anode mixture layer A is $\alpha$ (%), and a volume ratio of an anode active material in the anode mixture layer B is $\beta$ (%).

11. The sulfide solid-state battery according to claim 8, wherein the volume ratio of the anode active material in the anode mixture layer A is no more than 60%.

12. The sulfide solid-state battery according to claim 8, wherein
a binder contained in the anode mixture layer A is different from the binder contained in the anode mixture layer B.

13. The sulfide solid-state battery according to claim 12, wherein the binder contained in the anode mixture layer B is styrene-butadiene rubber.

* * * * *